Feb. 10, 1931.   W. M. CROSS   1,791,752
HOPPER FEED FOR COAL STOKERS
Filed Dec. 21, 1929
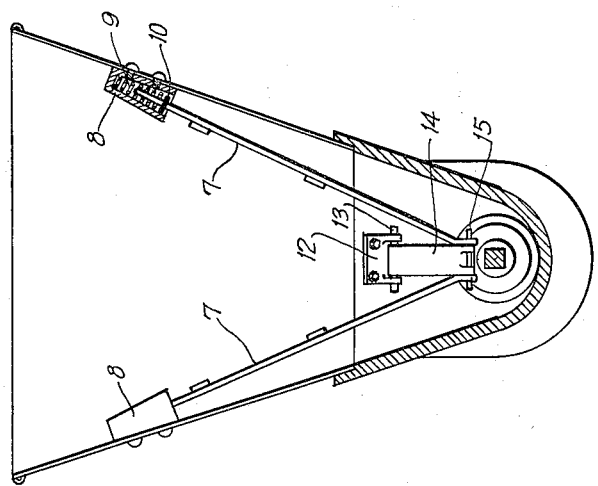
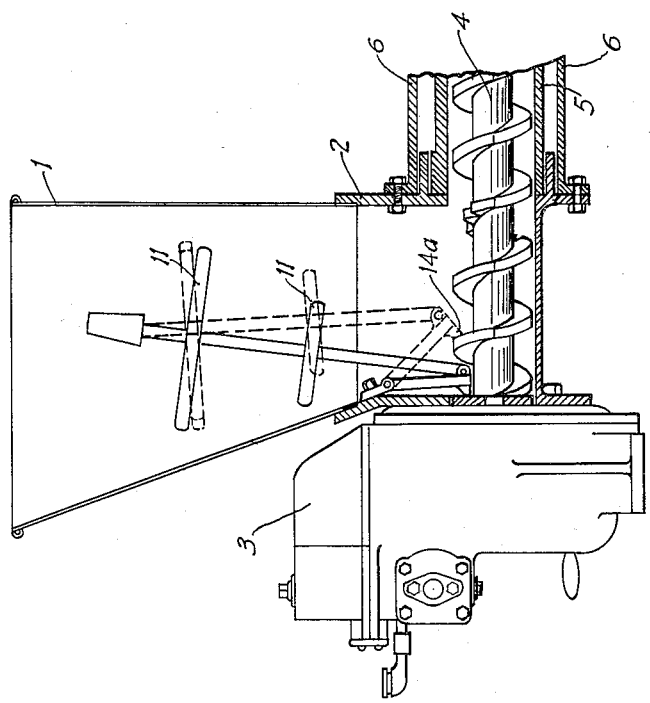
INVENTOR.
Walter M. Cross.
BY Thos. E. Scofield
ATTORNEY.

Patented Feb. 10, 1931

1,791,752

UNITED STATES PATENT OFFICE

WALTER M. CROSS, OF KANSAS CITY, MISSOURI

HOPPER-FEED FOR COAL STOKERS

Application filed December 21, 1929. Serial No. 415,842.

This invention relates to improvements in hopper feed for coal stokers and refers more particularly to a mechanism which is functioned by a screw conveyor for preventing the arching of coal in the hopper and assuring a continuous feed from the hopper to the conveyor screw.

The novelty of the invention lies primarily in the utilization of the threads of the conveyor screw to transmit a reciprocating and lateral movement of slide members which are positioned along the sides of the hopper to feed the coal from the hopper on to the screw.

Fig. 1 is a side view of the stoker, parts in section, parts broken away.

Fig. 2 is a sectional end view of the construction shown in Fig. 1.

Referring to the drawings; the stoker consists of a coal hopper 1 which is mounted above throat support members 2. At the rear of the stoker are the drive members enclosed in the casing designated as 3.

Coal placed in the hopper 1 feeds downwardly on to the screw conveyor 4 which is positioned in the feed tube 5 surrounded by an air duct or jacket 6. Lying along or adjacent the sides of the hopper are slide members or scraper rods 7, the upper extremities of which extend into spring housings 8 which enclose compression springs 9. At the lower portion of the springs and attached to the scraped rods are washers 10. To the scraper rods are fixedly attached cross scraper members 11. Near the bottom of the hopper and at the rear is attached a plate 12 which has lugs or ears which are drilled and support a bearing pin 13. This bearing pin also functions as a pivot for the arm 14 to which it may be fixedly or loosely mounted. A second bearing pin 15 extends through lugs in the lower extremity of the arm 14 and, pivoted to this bearing pin are the lower extremities of the slides or scraper rods 7. A lug 14a at the rear of the arm and at the bottom is adapted to contact with the whirl of the screw conveyor 4 so that the arm is moved forwardly with the whirl of the screw conveyor remaining in contact therewith until the whirl has advanced to a position just beyond the dotted line position shown in Fig. 1.

As the arm advances with the whirl of the screw, it is lifted and drops over the top of the screw thread, returning to the full line position shown in Fig. 1. This movement of the arm produces a lateral and reciprocating movement of the slide bars or scraper rods 7 and, as these scrapers are positioned along the sides of the bin, they destroy the contact or purchase which the coal pile has with the sides of the bin and prevent the arching of the coal in the hopper.

The scraper rods may be positioned to lie close to the hopper surface or may be arranged as shown in the drawings, depending principally upon the character of the coal being used. As the arm 14 moves forward with the whirl of the screw conveyor the coal accumulating around the arm will be also moved away from the space behind the whirl leaving a space which permits the return of the arm to its original position.

The scrapers destroy the base of the arch in their movement along the sides of the hopper where the coal is supported by the hopper and assure a constant downward feed of the coal to the screw. The spring tension imposed upon the upper extremities of the scraper rods give a slight jolting effect that further tends to prevent arching of the coal. The lateral movement produced by the forward travel of the arm which carries the lower extremities of the scrapers, together with the reciprocating movement, assure a proper feed of the coal through the hopper.

Some coals, particularly screenings, when moist, stand in vertical walls and unless a mechanism of this type is employed there is no assurance that the coal will be fed to the screw conveyor. Utilizing the screw for producing movement of the scraper in the manner set out, very little power is required to give a very positive movement to the scraper rods.

I claim as my invention:

1. A hopper feed for screw fed coal stokers, comprising movable members positioned inside of the hopper and adjacent the walls thereof, an arm pivoted in the lower portion of the hopper to which movable members are pivoted, said arm contacting the whirl of the screw and adapted to give the movable members both a horizontal and vertical movement with the rotation of the screw.

2. A hopper feed for screw fed coal stokers, comprising movable members positioned inside of the hopper and adjacent the walls thereof, an arm pivoted in the lower portion of the hopper, springs imposing downward force on the movable members, said arm contacting the whirl of the screw and adapted to give the movable members both a horizontal and vertical movement operating against the spring compression.

In testimony whereof I affix my signature.

WALTER M. CROSS.